(12) United States Patent
Nishida et al.

(10) Patent No.: US 9,253,437 B2
(45) Date of Patent: Feb. 2, 2016

(54) MOBILE COMMUNICATION METHOD AND MOBILITY MANAGEMENT NODE

(75) Inventors: Katsutoshi Nishida, Tokyo (JP); Takashi Koshimizu, Tokyo (JP); Hideaki Takahashi, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 44 days.

(21) Appl. No.: 13/984,002

(22) PCT Filed: Feb. 7, 2012

(86) PCT No.: PCT/JP2012/052727
§ 371 (c)(1),
(2), (4) Date: Aug. 6, 2013

(87) PCT Pub. No.: WO2012/108423
PCT Pub. Date: Aug. 16, 2012

(65) Prior Publication Data
US 2013/0321558 A1 Dec. 5, 2013

(30) Foreign Application Priority Data
Feb. 7, 2011 (JP) ................................. 2011-024383

(51) Int. Cl.
H04N 7/14 (2006.01)
H04W 36/00 (2009.01)
H04W 36/14 (2009.01)

(52) U.S. Cl.
CPC ........... *H04N 7/147* (2013.01); *H04W 36/0027* (2013.01); *H04W 36/14* (2013.01)

(58) Field of Classification Search
None
See application file for complete search history.

(56) References Cited

U.S. PATENT DOCUMENTS

| 8,391,239 B2 * | 3/2013 | Tenny | H04W 36/0066 370/280 |
| 8,619,648 B2 * | 12/2013 | Guo | H04W 68/12 370/310 |
| 8,812,000 B2 * | 8/2014 | Pitkamaki | H04W 36/14 370/331 |
| 2004/0045069 P1 * | 3/2004 | Rabin et al. | |
| 2004/0148392 A1 * | 7/2004 | Cotte | H04L 67/02 709/225 |

(Continued)

FOREIGN PATENT DOCUMENTS

| CN | 101044771 A | 9/2007 |
| JP | 2008-519520 A | 6/2008 |

(Continued)

OTHER PUBLICATIONS

Office Action issued in Canadian Patent Application No. 2,826,668, mailed Oct. 7, 2013 (4 pages).

(Continued)

*Primary Examiner* — Maria El-Zoobi
(74) *Attorney, Agent, or Firm* — Osha Liang LLP (57) ABSTRACT

To provide a scheme for deciding a switching method for the video call when an UE#1 in video call with an UE#2 is caused to perform handover from an E-UTRAN to a UTRAN/GERAN. A mobile communication method according to the present invention is summarized by including the steps of: deciding the switching method for the video call, when a video bearer and a voice bearer which configure a path for the video call are set, by an IMS; and maintaining information on the decided switching method and association information with which information on the video bearer is in association with information on the voice bearer, by a mobile communication network and an eNB.

10 Claims, 8 Drawing Sheets

(56) References Cited

U.S. PATENT DOCUMENTS

| | | | |
|---|---|---|---|
| 2006/0045069 A1* | 3/2006 | Zehavi | H04L 12/5692 370/352 |
| 2008/0143817 A1* | 6/2008 | Miali et al. | 348/14.01 |
| 2009/0156215 A1* | 6/2009 | Pitkamaki | H04W 36/14 455/437 |
| 2010/0234029 A1 | 9/2010 | Ishii et al. | |
| 2011/0221858 A1* | 9/2011 | Laiho | H04N 7/148 348/14.02 |
| 2012/0182864 A1* | 7/2012 | Heinz | H04L 12/5695 370/221 |

FOREIGN PATENT DOCUMENTS

| | | |
|---|---|---|
| JP | 2010-028680 A | 2/2010 |
| JP | 2010-045691 A | 2/2010 |
| WO | 2006/048697 A1 | 5/2006 |
| WO | 2009/031659 A1 | 3/2009 |
| WO | 2009/117588 A1 | 9/2009 |
| WO | 2011056046 A2 | 5/2011 |

OTHER PUBLICATIONS

3GPP TSG SA WG2 Meeting #81; S2104983 "Procedure for E-UTRAN to UTRAN/CS Video Call Continuity;" Prague, Czech Republic; Oct. 11-15, 2010 (26 pages).
Office Action in counterpart Canadian Patent Application No. 2,826,668 issued Jun. 16, 2014 (3 pages).
International Search Report in corresponding International Application No. PCT/JP2012/052727 mailed May 1, 2012 (5 pages).
Written Opinion in corresponding International Application No. PCT/JP2012/052727 mailed May 1, 2012 (3 pages).
3GPP TS 23.216 V9.6.0; "3rd Generation Partnership Project; Technical Specification Group Services and System Aspects; Single Radio Voice Call Continuity (SRVCC); Stage 2 (Release 9)"; Dec. 2010 (42 pages).
3GPP TS 23.228 V10.3.0; "3rd Generation Partnership Project; Technical Specification Group Services and System Aspects; IP Multimedia Subsystem (IMS); Stage 2 (Release 10)"; Dec. 2012 (274 pages).
3GPP TR 23.886 V1.0.0; "3rd Generation Partnership Project; Technical Specification Group Services and System Aspects; Feasibility Study of Single Radio Video Call Continuity (vSRVCC); Stage 2 (Release 10)"; Sep. 2010 (33 pages).
3GPP TS 23.237 V9.7.0; "3rd Generation Partnership Project; Technical Specification Group Services and System Aspects; IP Multimedia Subsystems (IMS) Service Continuity; Stage 2 (Release 9)"; Dec. 2010 (89 pages).
3GPP TS 23.203 V11.0.1; "3rd Generation Partnership Project; Technical Specification Group Services and System Aspects; Policy and charging control architecture (Release 11)"; Jan. 2011 (137 pages).
3GPP TS 23.401 V10.2.0; "3rd Generation Partnership Project; Technical Specification Group Services and System Aspects; General Packet Radio Service (GPRS) enhancements for Evolved Universal Terrestrial Radio Access Network (E-UTRAN) access (Release 10)", Dec. 2010 (276 pages).
Office Action in corresponding Japanese Application No. 2011-024383 mailed Apr. 24, 2012 (5 pages).
Office Action issued in Canadian Patent Application No. 2,826,668, issued Feb. 27, 2014 (5 pages).
Office Action issued in Chinese Patent Application No. 2012800079313, issued Mar. 4, 2014, with translation (15 pages).
Office Action in counterpart Australian Patent Application No. 2012215743, mailed Sep. 25, 2014 (3 pages).
Office Action issued in counterpart Canadian Patent Application No. 2,826,668, mailed Nov. 5, 2014 (3 pages).
European Search Report issued in corresponding European Patent Application 12744772.0 dated Mar. 10, 2015 (10 pages).
Samsung, "Bearer identification for vSRVCC handover key issue", 3GPP TSG SA WG2 Meeting #79; TD S2-102719 (was S2-102415 and S2-102454); Kyoto, Japan, May 10, 2010 through May 14, 2010 (7 pages).
NEC, NTT DOCOMO, Samsung, "PS-CS Single Radio Access transfer for vSRVCC", 3GPP TSG SA WG2 Meeting #81; S2-104996; Prague, Czech Republic, Oct. 11, 2010 through Oct. 15, 2010 (13 pages).
Samsung, "Assessment of the solutions in the bearer identification key issue", 3GPP TSG SA WG2 Meeting #80; TD S2-103604; Brunstad, Norway, Aug. 30, 2010 through Sep. 3, 2010 (5 pages).
Office Action in corresponding Egyptian Patent Application No. PCT/NA2013/001285 dated Apr. 15, 2015, with translation (7 pages).

* cited by examiner

MOBILE COMMUNICATION METHOD AND MOBILITY MANAGEMENT NODE

TECHNICAL FIELD

The present invention relates to a mobile communication method and a mobility management node.

BACKGROUND ART

Conventionally, mobile communication systems capable of connecting a radio access network of 2G/3G schemes (UTRAN: Universal Terrestrial Radio Access Network or GERAN: GSM EDGE Radio Access Network), and a radio access network (E-UTRAN: Evolved Universal Terrestrial Radio Access Network) of an LTE (Long Term Evolution) scheme have been known.

An "SRVCC (Single Radio Voice Call Continuity) scheme" is specified in TS23.216 of the 3GPP (see Non-Patent Document 1). In the SRVCC scheme, a path is switched from a path via the E-UTRAN/UTRAN (path for VoIP (Voice over IP) communication) to a path via the UTRAN/GERAN (path for CS (Circuit Switch) communication) without disconnection of a path for voice call between UE (User Equipment) #1 and UE#2.

Furthermore, a "vSRVCC (Single Radio Video Call Continuity) scheme" is standardized by TR23.886 of the 3GPP (see Non-Patent Document 2). In the vSRVCC scheme, a path is switched from a path via the E-UTRAN/UTRAN (path for VoIP communication) to a path via the UTRAN (path for CS communication) without disconnection of a path for video call between UE#1 and UE#2.

PRIOR ART DOCUMENT

Non-Patent Document

Non-Patent Document 1: 3GPP TS23.216
Non-Patent Document 2: 3GPP TR23.886

SUMMARY OF THE INVENTION

However, there has been a problem in the above-mentioned mobile communication system in that, when the UE#1 in video call with the UE#2 is caused to perform handover from the E-UTRAN to the UTRAN/GERAN, no scheme for deciding a switching method for the video call is present. The switching method is as follows: whether both a video bearer and a voice bearer which configure a path for the video call are switched; whether a voice bearer alone which configures a path for the video call is switched; or whether neither a video bearer nor a voice bearer, both of which configure a path for the video call, is switched.

The present invention is made in view of the abovementioned problem. An objective of the present invention is to provide a mobile communication method and a mobility management node capable of providing a scheme for deciding a switching method for the video call when the UE#1 in video call with the UE#2 is caused to perform handover from the E-UTRAN to the UTRAN/GERAN.

A first aspect of the present invention is summarized by a mobile communication method in a mobile communication system which includes a first radio access network not supporting circuit-switched communications, a mobile communication network which connects the first radio access network, a second radio access network supporting the circuit-switched communications, and a service control network, and which is capable of switching from a path via the first radio access network to a path via the second radio access network without disconnection of a path for video call performed between a first mobile station and a second mobile station. The mobile communication method includes the steps of: deciding a switching method for the video call by the service control network when a video bearer and a voice bearer which configure a path for the video call are set; maintaining information on the switching method decided and association information with which information on the video bearer is in association with information on the voice bearer, by the mobile communcation network and a radio base station in the first radio access network; requesting the service control network to delete the video bearer, by the first mobile station; requesting the mobile communcation network to delete the video bearer, by the service control network; deleting the information on the video bearer from the association information in response to the request from the service control network, and requesting the radio base station to delete the video bearer, by the mobile communcation network; and deleting the information on the video bearer from the association information in response to the request from the mobile communcation network, by the radio base station.

MODE FOR CARRYING OUT THE INVENTION (Mobile Communication System According to First Embodiment of Present Invention)

A mobile communication system according to a first embodiment of the present invention will be explained with reference to FIG. 1 to FIG. 8.

In the mobile communication system according to the embodiment, with a vSRVCC scheme or an improved vSRVCC scheme, a path can be switched from a path via the E-UTRAN/UTRAN (path for IMS VoIP communication) to a path via the UTRAN/GERAN (path for circuit-switched communications), without disconnection of a path for video call between an UE#1 and an UE#2

Here, the improved vSRVCC scheme indicates a scheme in which, by using an ATCF (Access Transfer Control Function)

or an ATGW (Access Transfer Gateway) which are standardized by TR23.237 of the 3GPP, an SRVCC scheme (hereinafter, referred to an improved SRVCC scheme) which performs switching in a network where the UE#1 is located is applied to the vSRVCC scheme.

Figure 1:
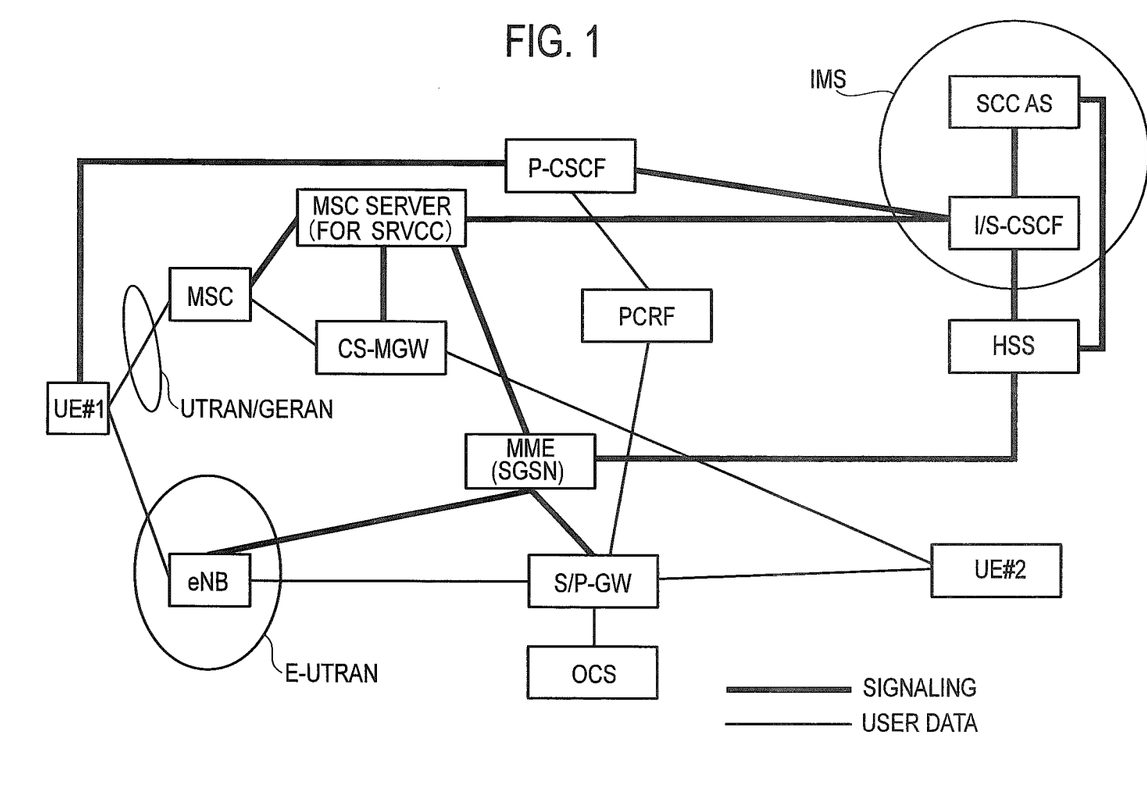
FIG. 1 is an overall configuration diagram of a mobile communication system according to a first embodiment of the present invention.
Figure 2:
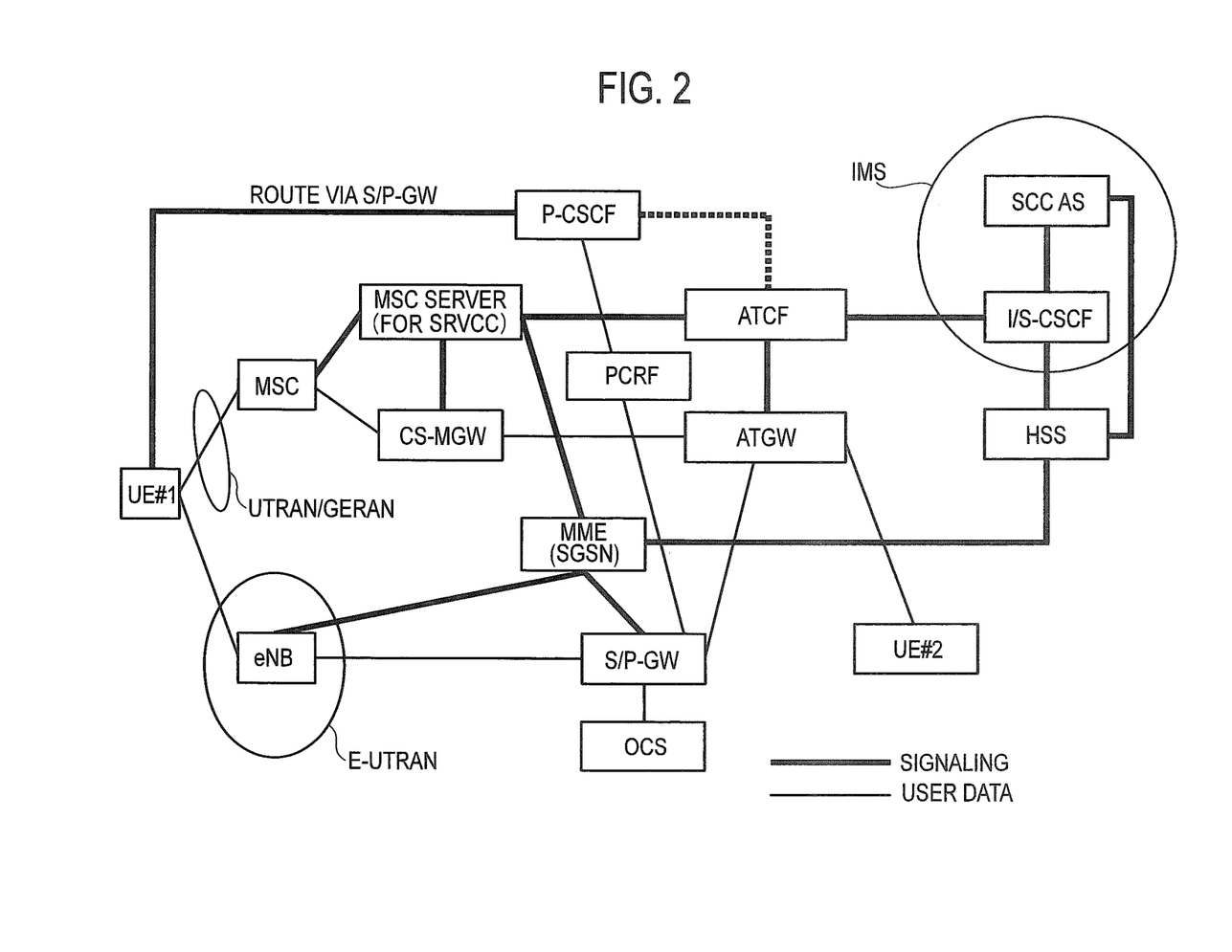
FIG. 2 is another overall configuration diagram of the mobile communication system according to the first embodiment of the present invention.

FIG. 1 shows a configuration of a mobile communication system according to the embodiment when the vSRVCC scheme is used, and FIG. 2 shows another configuration of the mobile communication system according to the embodiment when the improved vSRVCC scheme is used.

In the example shown in FIG. 1, the mobile communication system according to the embodiment connects the E-UTRAN and the UTRAN/GERAN.

Specifically, as shown in FIG. 1, the mobile communication system according to the embodiment includes, in the network where the UE#1 is located, an eNB (radio base station), an RNC (Radio Network Controller, radio channel control station, not shown), an NodeB/BSS (radio base station, not shown), an MME (Mobility Management Entity, mobility management node), an S-GW (Serving-Gateway, serving gateway device), a P-GW (PDN-Gateway, PDN gateway device), a P-CSCF (Proxy-Call Session Control Function, proxy session control device), an MSC (Mobile-service Switching Center, circuit switching device), an SGSN (Serving GPRS Support Node, packet switching device), an MSC server, a CS (Circuit Switch)-MGW (Media Gateway), a PCRF (Policy and Charging Rules Function, policy and charging rules device), an OCS (Online Charging System), or the like.

Furthermore, the mobile communication system according to the embodiment includes an SCC-AS, and I/S-CSCF, or the like, in an IMS (IP Multimedia Subsystem).

Meanwhile, in the example shown in FIG. 2, the mobile communication system according to the embodiment includes an ATCF (Access Transfer Control Function), an ATGW (Access Transfer Gateway), or the like, in addition to the configuration of the mobile communication system according to the embodiment shown in FIG. 1.

The ATCF and the ATGW are standardized by TS23.237 of the 3GPP as devices for the improved SRVCC scheme, and are applicable to the present invention in the similar manner. In other words, in the improved vSRVCC scheme, the ATGW is an anchor node configured to perform the abovementioned switching, and the ATCF is a control device configured to control the ATGW.

Operations of the mobile communication system according to the embodiment will be explained below with reference to FIG. 3 to FIG. 8.

Firstly, an originating procedure of video call of the UE#1 with the UE#2 via the IMS in the mobile communication system according to the embodiment will be explained with reference to FIG. 3 to FIG. 6.

Figure 3:
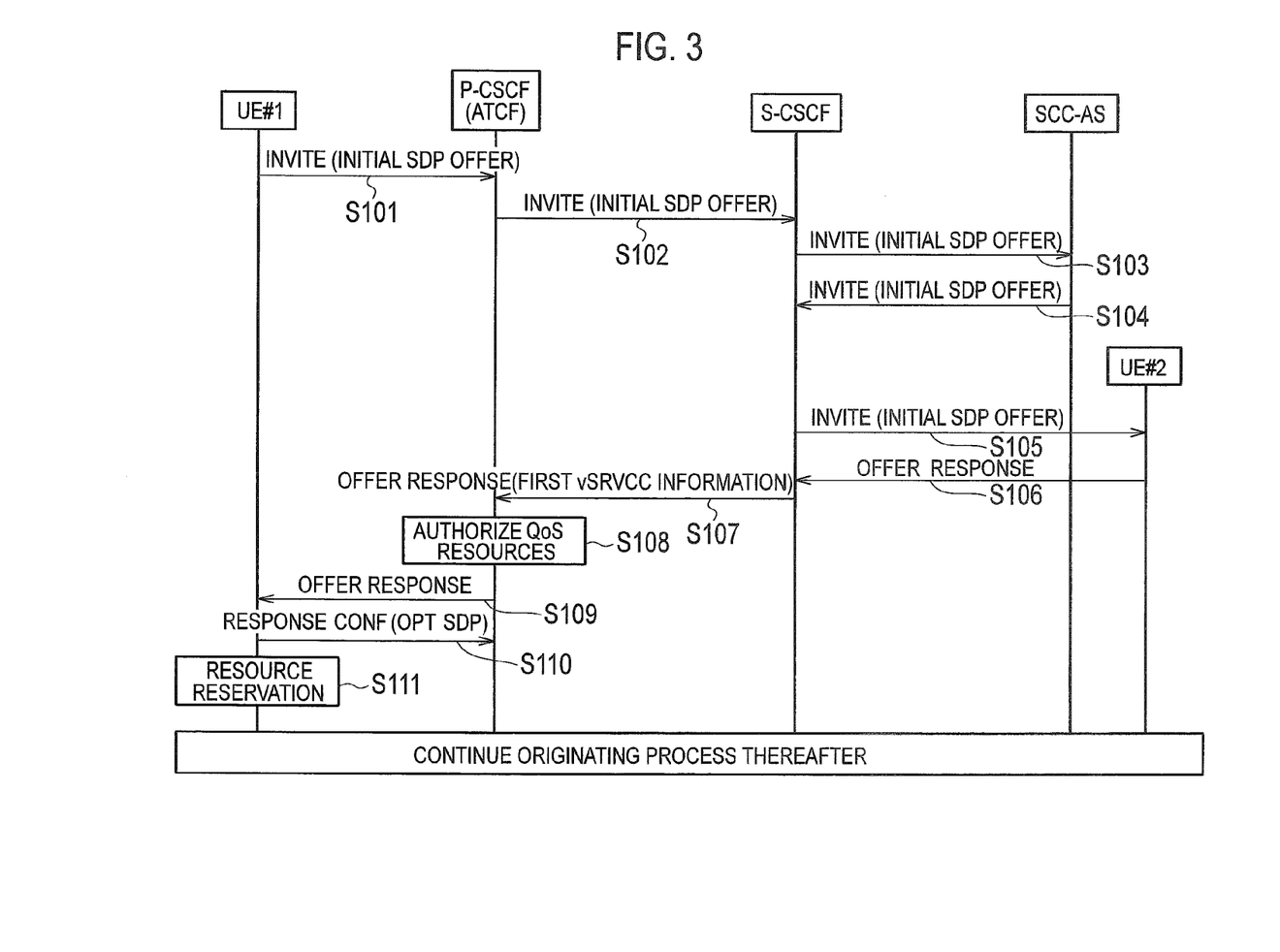
FIG. 3 is a sequence diagram for explaining operations of the mobile communication system according to the first embodiment of the present invention.

Note that, the procedure shown in FIG. 3 is obtained by simplifying the procedure standardized by TS23.228 or TS23.237 of the 3GPP, and portions not being described are in conformity with the procedure standardized by TS23.228 or TS23.237 of the 3GPP.

As shown in FIG. 3, at Step S101, the UE#1 transmits an "Invite (Initial SDP Offer)" to the P-CSCF (or, the ATCF, the same applies below), in response to an originating operation of video call by a user.

At Step S102, the P-CSCF transmits the "Invite (Initial SDP Offer)" to the S-CSCF in the IMS.

At Step S103, the S-CSCF transmits the "Invite (Initial SDP Offer)" to the SCC-AS in the IMS. At Step S104, the SCC-AS transmits the "Invite (Initial SDP Offer)" to the S-CSCF. At Step S105, the S-CSCF transmits the "Invite (Initial SDP Offer)" to the UE#2. At Step S106, the UE#2 transmits an "Offer Response" to the S-CSCF via the SCC-AS.

At any timing from Step S103 to S106, the SCC-AS or the S-CSCF decides a switching method for the video call.

Specifically, the SCC-AS or the S-CSCF may decide a switching method for the video call as follows: both a video bearer and a voice bearer which configure a path for the video call are switched without being disconnected; a voice bearer alone which configures a path for the video call is switched without being disconnected; or neither a video bearer nor a voice bearer, both of which configure a path for the video call, is switched (in other words, no process of the vSRVCC scheme is applied).

Furthermore, the SCC-AS or the S-CSCF may decide a switching method for the video call based on the profile of a subscriber related to the UE#1, abilities of a home network of the UE#1 (which includes information indicating whether or not video call can be provided in the circuit-switched communications), abilities of a network where the UE#1 is located (which includes information indicating whether or not video call can be provided in the circuit-switched communications), abilities of the UE#1 (for example, whether or not video call can be provided in the circuit-switched communications, whether or not the UE#1 adapts the vSRVCC scheme, or the like), roaming agreement information, operator policies, or the like.

At Step 107, the S-CSCF transmits an "Offer Response" including first vSRVCC information to the P-CSCF.

Here, the first vSRVCC information includes an "application type", "media information", or "the presence or absence of an object of the vSRVCC". Note that, "a presence or absence of an object of the vSRVCC" may not be included in the "Offer Response". In such a case, the PCRF may determine "the presence or absence of an object of the vSRVCC" when receiving the first vSRVCC information from the P-CSCF.

The "application type" is information indicating the type of the application used for the call related to the originating procedure. The "media information" is information indicating the type of the call related to the originating procedure (information indicating video call or voice call, information included in the SDP, or the like). "The presence or absence of an object of the vSRVCC" is information indicating whether each bearer which configures a path for call related to the originating procedure is an object of switching by the vSRVCC scheme.

Furthermore, the S-CSCF may notify the P-CSCF of the "switching method for the video call" together with the "Offer Response".

At Step S109, the P-CSCF transmits the "Offer Response" to the UE#1. At Step S110, the UE#1 transmits a "Response Conf (Opt SDP)" to the P-CSCF.

Note that, a process for reserving resources of a video bearer and a voice bearer which configure a path for the video call is performed at Step S108 or at Step S111.

Thereafter, originating procedures standardized by TS23.228, TS23.237, TS23.203, and TS23.401 of the 3GPP are continued.

Hereinafter, a process for reserving resources of a video bearer and a voice bearer performed at Step S108 (see TS23.203 of the 3GPP) will be explained with reference to FIG. 4 and FIG. 6, and a process for reserving resources of a video bearer and a voice bearer performed at Step S110 (see TS23.401 of the 3GPP) will be explained with reference to FIG. 5 and FIG. 6.

Figure 4:
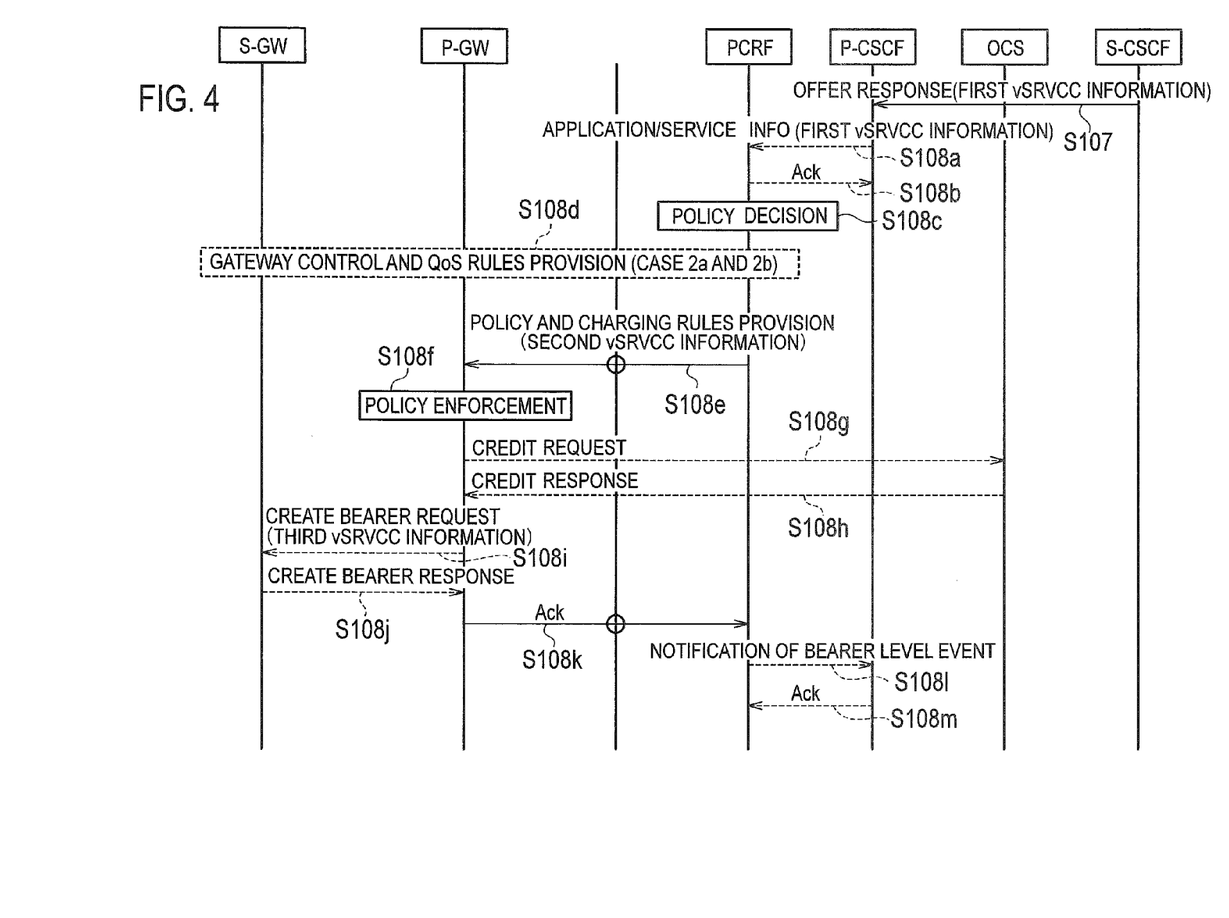
FIG. 4 is a sequence diagram for explaining operations of the mobile communication system according to the first embodiment of the present invention.

As shown in FIG. 4, upon receiving the "Offer Response" including the first vSRVCC information from the S-CSCF at Step 107, the P-CSCF transmits "Application/Service Info" including the first vSRVCC information to the PCRF at Step S108a.

The PCRF transmits an "Ack" to the P-CSCF at Step S108b, decides a policy related to the video call at Step S108c, and transmits a "Policy and Charging Rules Provision" including second vSRVCC information to the P-GW at Step S108e.

Here, the second vSRVCC information includes the abovementioned "media information (QoS Rule, QoS Information, or the like)" or "the presence or absence of an object of the vSRVCC". Furthermore, the second vSRVCC information may include information on the abovementioned switching method for the video call.

If "the presence or absence of an object of the vSRVCC" is not set in the first vSRVCC information, the PCRF may determine whether or not each bearer is an object of switching by the vSRVCC scheme based on the "application type", the "media information", or the like, which are set in the first vSRVCC information.

At Step S108d, a Gateway Control process and a QoS Rules Provision process are performed. Here, when a PMIP (Proxy Mobile IP) is used, the PCRF can notify the eNB of the abovementioned second vSRVCC information through with these processes. Note that, the processes may be performed followed by a process at Step S108k.

The P-GW performs a Policy Enforcement process at Step S108e, and transmits a "Credit Request" to the OCS at Step S108g.

At Step S108h, the OCS transmits a "Credit Response" to the P-GW. At Step S108i, the P-GW transmits a "Create Bearer Request" including third vSRVCC information to the S-GW.

Here, the third vSRVCC information includes "bearer context association information" or "the presence or absence of an object of the vSRVCC" described above.

The "bearer context association information" is information indicating association information on a bearer which configures a path for the call related to the originating procedure, and performs a setting request in the network with the signal (for example, information indicating a bearer context A being in cooperation with a bearer context B, information indicating "QCI (QoS Class Identifier)=1" being in cooperation with "QCI=2", or the like).

Furthermore, the third vSRVCC information may include information on the abovementioned switching method for the video call.

Figure 6:
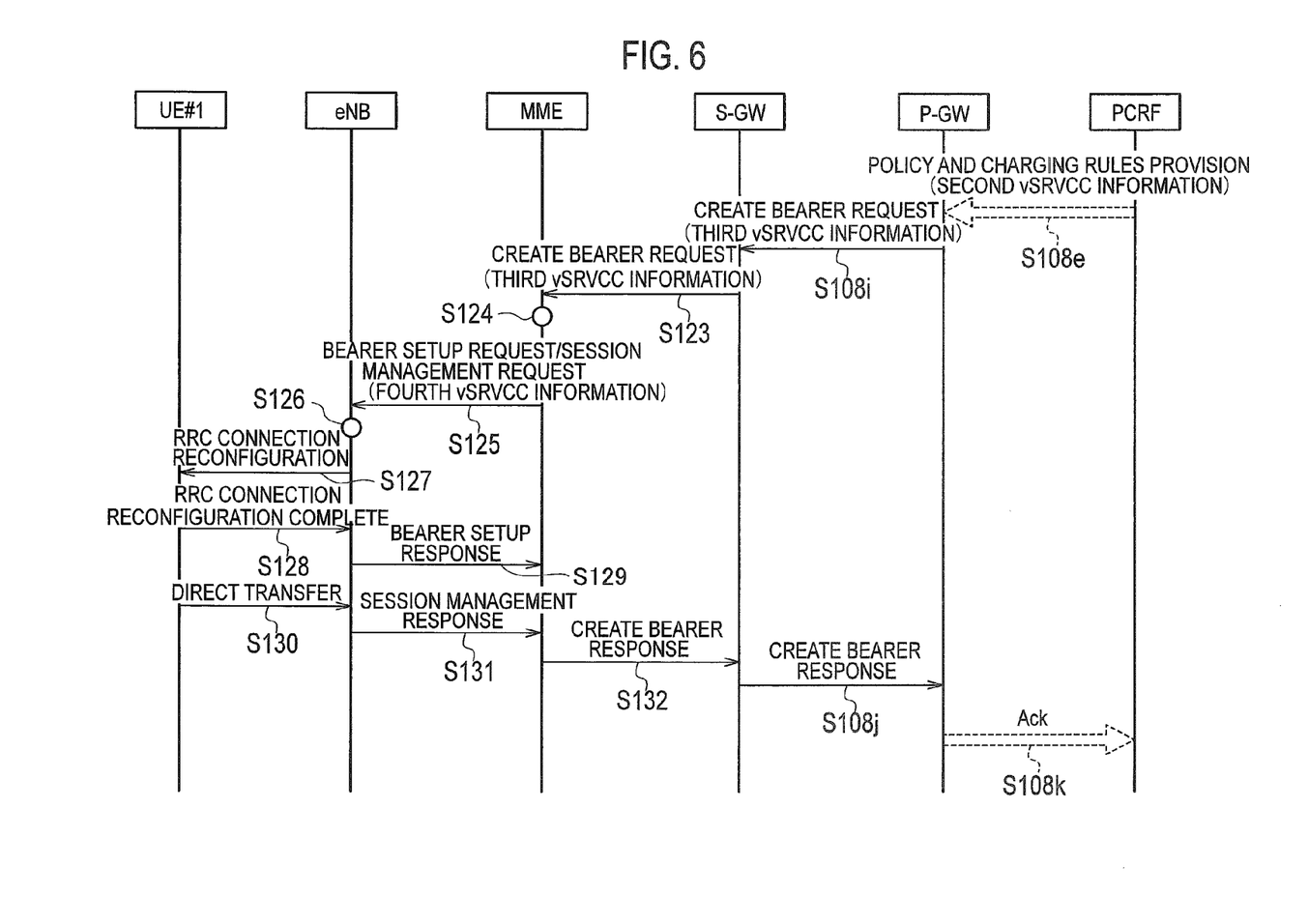
FIG. 6 is a sequence diagram for explaining operations of the mobile communication system according to the first embodiment of the present invention.

Upon receiving the "Create Bearer Request" including the third vSRVCC information from the P-GW at Step S108i, the S-GW transmits the "Create Bearer Request" including the third vSRVCC information to the MME at Step S123, as shown in FIG. 6.

The MME maintains information on the above-mentioned switching method for the video call and association information with which a "bearer identifier" indicating a video bearer is in association with a "bearer identifier" indicating a voice bearer at Step S124, and transmits a "Bearer Setup Request" (which includes a "Session Management Request") including fourth vSRVCC information to the eNB at Step S125.

Here, the fourth vSRVCC information includes "bearer identifiers (a bearer identifier indicating a voice bearer and a bearer identifier indicating a video bearer)", which is information indicating each bearer which configures a path for the call related to the originating procedure and is allocated in the MME in accordance with the abovementioned "Create Bearer Request", association information with which a "bearer identifier" indicating a video bearer is in association with a "bearer identifier" indicating a voice bearer, or "the presence or absence of an object of the vSRVCC" described above.

Furthermore, the fourth vSRVCC information may include information on the abovementioned switching method for the video call.

Note that, if the UE#1 is in an "IDLE state", an "Initial Context Setup Request" is used as the "Session Management Request", while the UE#1 is an "ACTIVE state", an "E-RAB Setup Request" is used as the "Session Management Request". Furthermore, other signals may be used as the "Session Management Request".

The eNB maintains information on the above-mentioned switching method for the video call and the association information with which a "bearer identifier" indicating a video bearer is in association with a "bearer identifier" indicating a voice bearer at Step S126, and transmits an "RRC Connection Reconfiguration" to the UE#1 at Step S127.

Note that, the MME and the eNB may determine whether each bearer is an object of switching by the vSRVCC scheme, based on the association information with which a "bearer identifier" indicating a video bearer is in association with a "bearer identifier" indicating a voice bearer, instead of "the presence or absence of an object of the vSRVCC" described above.

At Step S128, the UE#1 transmits an "RRC Connection Reconfiguration Complete" to the eNB. At Step S129, the eNB transmits a "Bearer Setup Response" to the MME.

At Step S130, the UE#1 transmits a "Direct Transfer" to the eNB. At Step S131, the eNB transmits a "Session Management Response" to the MME.

At Step S132, the MME transmits a "Create Bearer Response" to the S-GW. As shown in FIG. 4, at Step S108j, the S-GW transmits the "Create Bearer Response" to the P-GW.

At Step S108k, the P-GW transmits an "Ack" to the PCRF. At Step S108l, the PCRF transmits a "Notification of Bearer Level Event" to the P-CSCF. At Step S108m, the P-CSCF transmits an "Ack" to the PCRF.

Figure 5:
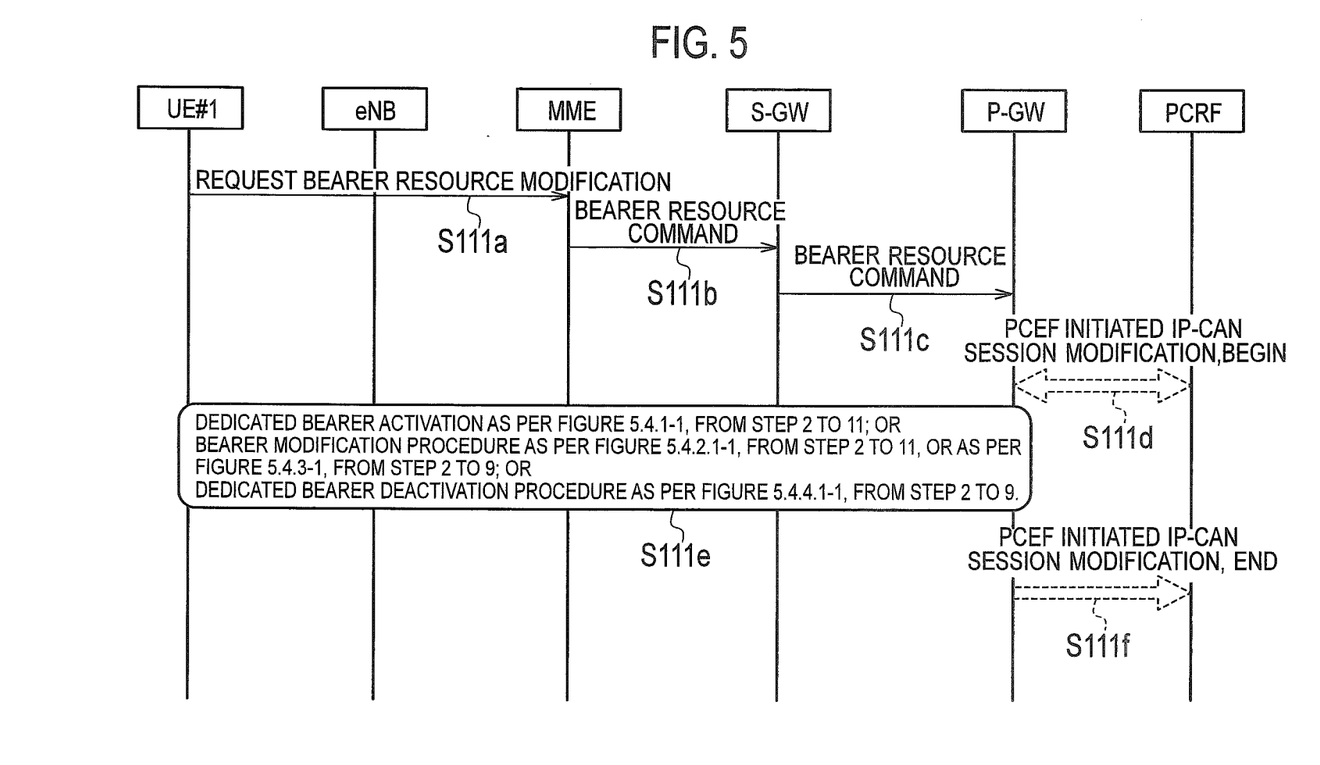
FIG. 5 is a sequence diagram for explaining operations of the mobile communication system according to the first embodiment of the present invention.

Meanwhile, when a process for reserving resources of a video bearer and a voice bearer is performed at Step S111, the UE#1 transmits a "Request Bearer Resource Modification" to the MME at Step S111a, as shown in FIG. 5.

At Step S111b, the MME transmits a "Bearer Resource Command" to the S-GW. At Step S111c, the S-GW transmits the "Bearer Resource Command" to the P-GW.

At Step S111d, a "PCEF Initiated IP-CAN (IP Connectivity Access Network) Session Modification process" is started.

At Step S111e, operations from Step S108i to S108j, which are shown in FIG. 6, are performed.

At Step S111f, the "PCEF Initiated IP-CAN Session Modification process" is completed.

With the operations, in the originating procedure of video call of the UE#1 with the UE#2 via the IMS, the MME and the eNB can maintain information on a switching method for the video call and association information with which a "bearer identifier" indicating a video bearer is in association with a "bearer identifier" indicating a voice bearer. Accordingly, the use of the association makes it possible to decide, in handover from the E-UTRAN to the UTRAN/GERAN of the UE#1 in video call with the UE#2, whether both a video bearer and a voice bearer are switched, whether a voice bearer alone is switched, or whether neither a video bearer nor a voice bearer is switched.

Secondary, a video bearer deleting procedure in the video call of the UE#1 with the UE#2 via the IMS in the mobile communication system according to the embodiment will be explained with reference to FIG. 7.

Figure 7:
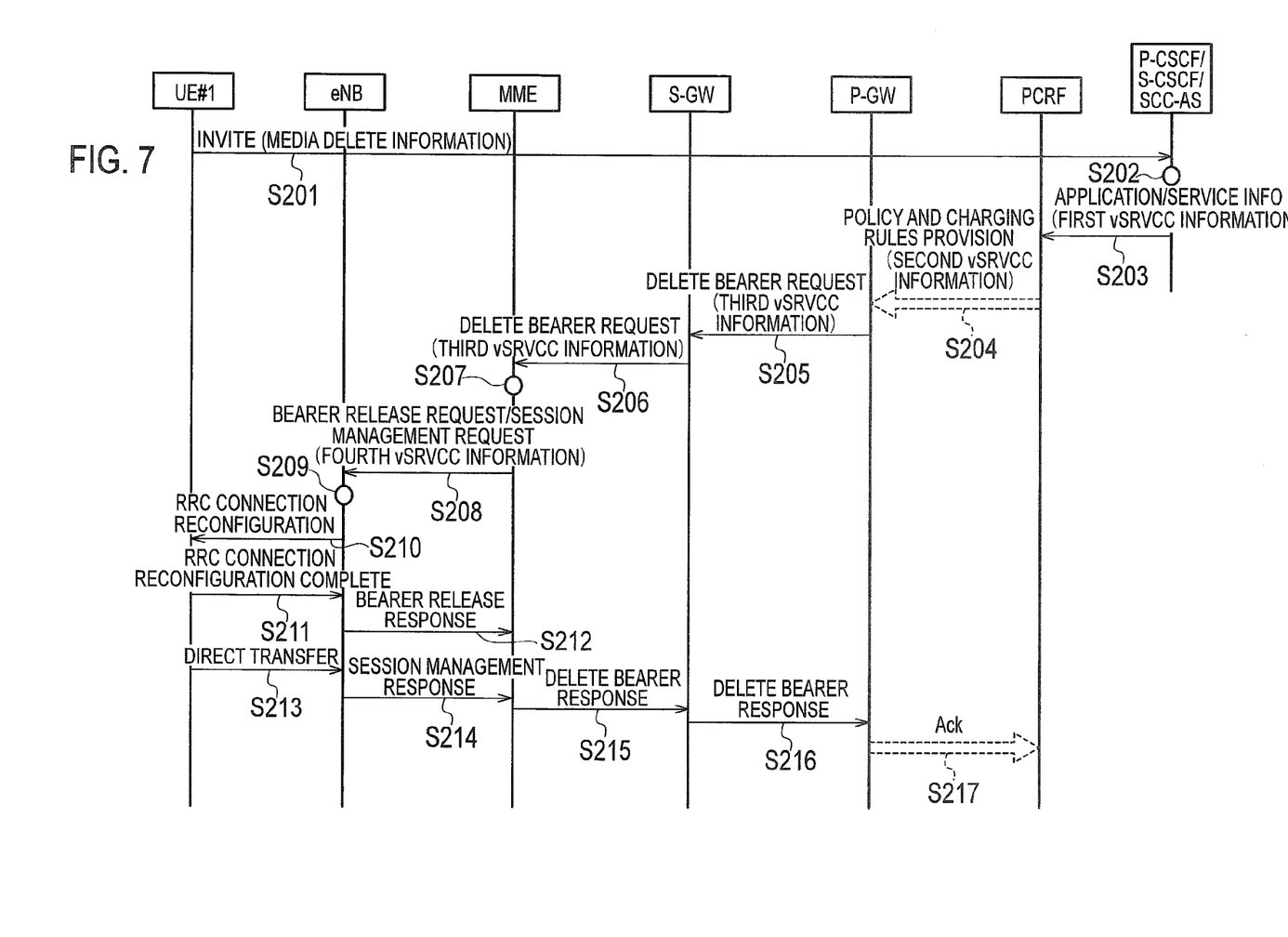
FIG. 7 is a sequence diagram for explaining operations of the mobile communication system according to the first embodiment of the present invention.

In other words, an example shown in FIG. 7 indicates a case of changing from a state where video call is performed between the UE#1 and the UE#2 to a state where voice call is to be performed between the UE#1 and the UE#2.

As shown in FIG. 7, the UE#1 transmits, in response to a deleting operation of a video bearer by a user, an "Invite" including information indicating a media delete for requesting to delete a video bearer, via the P-CSCF to the IMS, at Step S201.

The IMS starts a delete process for a video bearer in the IP-CAN at Step S202, and transmits an "Application/Service Info" including the first vSRVCC information to the PCRF, whereby requesting the PCRF to delete the abovementioned video bearer, at Step S203.

At Step S204, the PCRF transmits a "Policy and Charging Rules Provision" including the second vSRVCC information to the P-GW, whereby requesting the P-GW to delete the above-mentioned video bearer.

At Step S205, the P-GW transmits a "Delete Bearer Request" including the third vSRVCC information to the S-GW. At Step S206, the S-GW transmits the "Delete Bearer Request" including the third vSRVCC information to the MME.

The MME deletes information on the video bearer from the stored association information at Step S207. In this manner, information on the switching method for the video call and association information with which a "bearer identifier" indicating a video bearer is in association with a "bearer identifier" indicating a voice bearer are deleted.

At Step S208, the MME transmits a "Bearer Release Request" (which includes the "Session Management Request") including the fourth vSRVCC information to the eNB.

Note that, an "E-RAB Release Command" an "E-RAB Modify Request", or the like is used as the "Session Management Request".

The eNB deletes the information on the switching method for the video call and the association information with which a "bearer identifier" indicating a video bearer is in association with a "bearer identifier" indicating a voice bearer, which have been stored therein, at Step S209, and transmits an "RRC Connection Reconfiguration" to the UE#1 at Step S210.

At Step S211, the UE#1 transmits an "RRC Connection Reconfiguration Complete" to the eNB. At Step S212, the eNB transmits a "Bearer Release Response" to the MME.

At Step S213, the UE#1 transmits a "Direct Transfer" to the eNB. At Step S214, the eNB transmits a "Session Management Response" to the MME.

At Step S215, the MME transmits a "Delete Bearer Response" to the S-GW. At Step S216, the S-GW transmits the "Delete Bearer Response" to the P-GW.

At Step S217, the P-GW transmits an "Ack" to the PCRF.

With the operations, when a state where video call is performed between the UE#1 and the UE#2 is changed to a state where voice call is to be performed between the UE#1 and the UE#2, the association information stored in the eNB and the MME can be updated.

Thirdly, a video bearer adding procedure in voice call of the UE#1 with the UE#2 via the IMS in the mobile communication system according to the embodiment will be explained with reference to FIG. 8.

Figure 8:
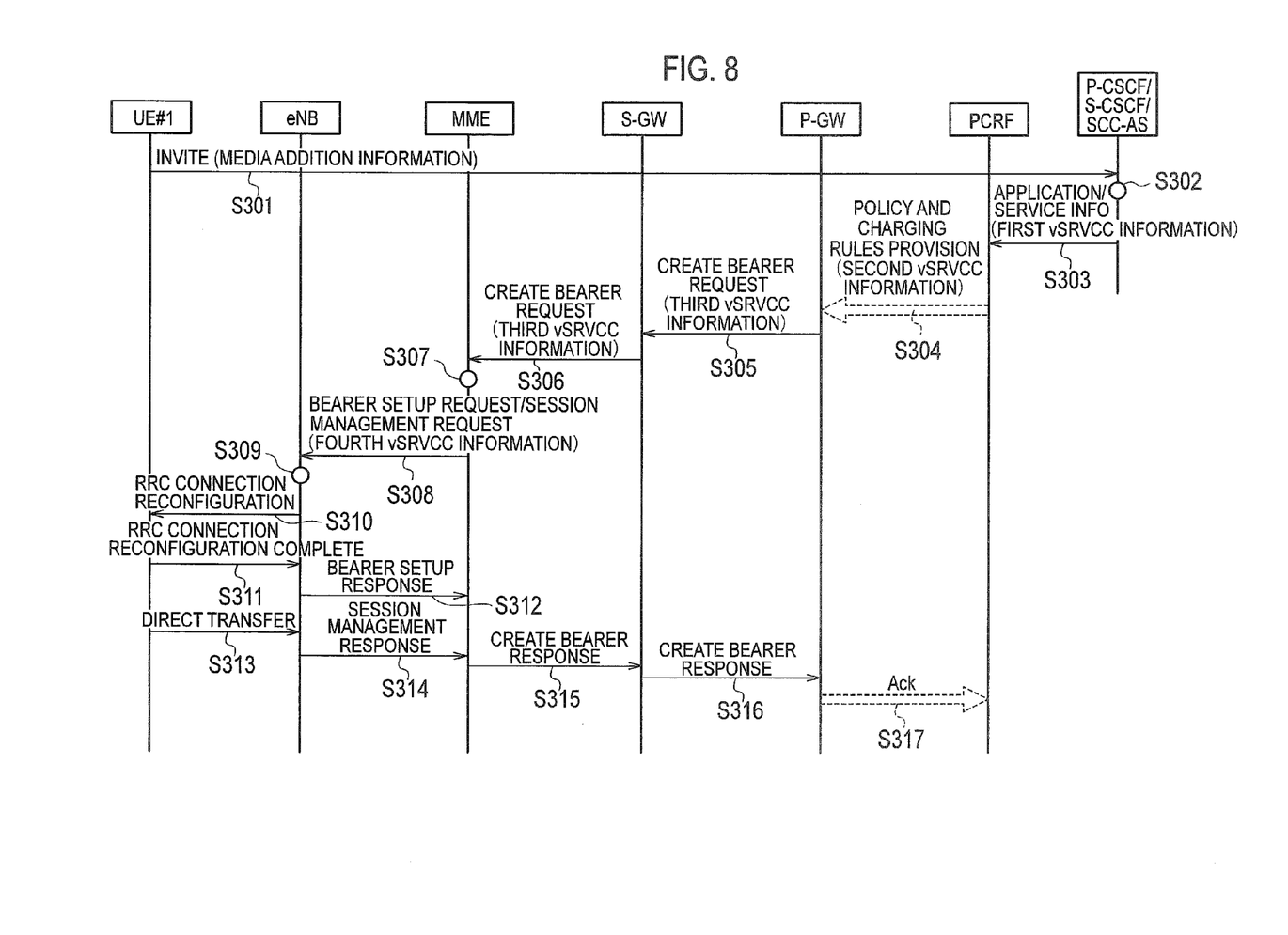
FIG. 8 is a sequence diagram for explaining operations of the mobile communication system according to the first embodiment of the present invention.

In other words, an example shown in FIG. 8 indicates a case of changing a state where voice call is performed between the UE#1 and the UE#2 to a state where video call is to be performed between the UE#1 and the UE#2.

As shown in FIG. 8, the UE#1 transmits, in response to an adding operation of a video bearer by a user, an "Invite" including information indicating a media addition for request to add a video bearer, via the P-CSCF to the IMS, at Step S301.

The IMS starts an addition process for a video bearer in the IP-CAN at Step S302, and transmits an "Application/Service Info" including the first vSRVCC information to the PCRF at Step S303, whereby requesting the PCRF to add the abovementioned video bearer.

At Step S304, the PCRF transmits a "Policy and Charging Rules Provision" including the second vSRVCC information to the P-GW, whereby requesting the P-GW to add the abovementioned video bearer.

At Step S305, the P-GW transmits a "Create Bearer Request" including the third vSRVCC information to the S-GW. At Step S306, the S-GW transmits the "Create Bearer Request" including the third vSRVCC information to the MME.

The "Create Bearer Request" includes "bearer context association information" including a context of a voice bearer to which the video bearer is added.

At Step S307, the MME creates a context of the video bearer, and maintains association information with which information on the allocated video bearer is in association with information on the voice bearer to which the video bearer is added.

Then, at Step S308, the MME transmits a "Bearer Setup Request" (which includes the "Session Management Request") including the fourth vSRVCC information to the eNB.

Note that, an "E-RAB Setup Request", an "E-RAB Modify Request", or the like is used as the "Session Management Request".

The eNB maintains the received association information at Step S309, and transmits an "RRC Connection Reconfiguration" to the UE#1 at Step S310.

At Step S311, the UE#1 transmits an "RRC Connection Reconfiguration Complete" to the eNB. At Step S312, the eNB transmits a "Bearer Setup Response" to the MME.

At Step S313, the UE#1 transmits a "Direct Transfer" to the eNB. At Step S314, the eNB transmits a "Session Management Response" to the MME.

At Step S315, the MME transmits a "Create Bearer Response" to the S-GW. At Step S316, the S-GW transmits the "Create Bearer Response" to the P-GW.

At Step S317, the P-GW transmits an "Ack" to the PCRF.

With the operations, when a state where voice call is performed between the UE#1 and the UE#2 is changed to a state where video call is to be performed between the UE#1 and the UE#2, the association information stored in the eNB and the MME can be updated.

The features according to the embodiment described above may be expressed in the following manner.

The feature according to the first embodiment is summarized by a mobile communication method in a mobile communication system which includes an E-UTRAN (first radio access network not supporting circuit-switched communications), a mobile communication network which connects the E-UTRAN, an UTRAN/GERAN (second radio access network supporting the circuit-switched communications), and an IMS (service control network), and which is capable of switching from a path via the E-UTRAN to a path via the UTRAN/GERAN without disconnection of a path for video call performed between an UE#1 (first mobile station) and an UE#2 (second mobile station), by using the vSRVCC scheme or the improved vSRVCC scheme. The mobile communication method includes the steps of: deciding a path for the video call by the IMS when a video bearer and a voice bearer which configure a path for the video call are set; maintaining information on the decided switching method and association information with which information on the video bearer is in association with information on the voice bearer, by the mobile communcation network and an eNB (radio base station in the first radio access network); requesting the IMS to delete the video bearer, by the UE#1; requesting the mobile communcation network to delete the video bearer, by the IMS; deleting the information on the video bearer from the association information in response to the request from the IMS, and requesting the eNB to delete the video bearer, by mobile communcation network; and deleting the information on the video bearer from the association information in response to the request from the mobile communcation network, by the eNB.

The feature according to the first embodiment may include the steps of: requesting the IMS to add a video bearer, by the UE#1; requesting the mobile communcation network to add the video bearer, by the IMS; adding information on the video bearer to the association information, in response to the request from the IMS, and requesting the eNB to add the video bearer, by the mobile communcation network; and adding the information on the video bearer to the association information, in response to the request from the mobile communcation network, by the eNB.

In the feature according to the first embodiment, the information on the switching method may indicate any of the cases: a case where both of the video bearer and the voice bearer are switched without being disconnected; a case where the voice bearer alone is switched without being disconnected; and a case where neither of the video bearer nor the voice bearer is disconnected or switched.

Note that, operations of the MSC server, the CS-MGW, the MME, the SGSN, the S-GW, the P-GW, the P-CSCF, the I/S-CSCF, the SCC-AS, the ATCF, the ATGW, the HSS, the MSC, the UE#1, the UE#2, and the eNB may implemented by hardware, by software modules executed by a processor, or a combination thereof.

The software module may be provided in a storage medium of an arbitrary form, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to a processor so that the processor can read and write information from and in the storage medium. Furthermore, the storage medium may be integrated in the processor. Furthermore, the storage medium and the processor may be provided in an ASIC. Such an ASIC may be provided in the MSC server, the CS-MGW, the MME, SGSN, the S-GW, the P-GW, the P-CSCF, the I/S-CSCF, the SCC-AS, the ATCF, the ATGW, the HSS, the MSC, the UE#1, the UE#2, or the eNB. Furthermore, the storage medium and the processor may be provided, as discrete components, in the MSC server, the CS-MGW, the MME, the SGSN, the S-GW, the P-GW, the P-CSCF, the I/S-CSCF, the SCC-AS, the ATCF, the ATGW, the HSS, the MSC, the UE#1, the UE#2, or the eNB.

The present invention has been explained in detail by using the abovementioned embodiment. However, it is obvious for a person skilled in the art that the present invention is not limited to the embodiment explained in the present description. The present invention can be implemented as modified and changed modes without deviating the gist and the range of the present invention specified by the claims. Accordingly, the indication of the present description aims at exemplary explanation, and has no intention to limit to the present invention.

Note that, the entire contents of Japanese Patent Application 2011-024383 (filed on Feb. 7, 2011) are incorporated in the description of the present application by reference.

Industrial Applicability

As described above, the present invention can provide a mobile communication method capable of providing a scheme for deciding a switching method for the video call when an UE#1 in video call with an UE#2 is caused to perform handover from the E-UTRAN to the UTRAN/GERAN.

Explanation of the Reference Numerals

UE#1, UE#2 mobile station
eNB radio base station
MME mobility management node
SGSN packet switching device
MSC circuit switching device
S-GW, P-GW gateway device

The invention claimed is:

1. A mobile communication method in a mobile communication system which includes a first radio access network not supporting circuit-switched communications, a mobile transmission network which connects the first radio access network, a second radio access network supporting the circuit-switched communications, and a service control network, and which is capable of switching from a path via the first radio access network to a path via the second radio access network without disconnection of a path for video call performed between a first mobile station and a second mobile station, the mobile communication method comprising the steps of:

deciding a switching method for the video call by the service control network when a video bearer and a voice bearer which configure a path for the video call are set;

retaining information on the switching method decided, information on the video bearer, and information on the voice bearer, by the mobile transmission network before switching from a path via the first radio access network to a path via the second radio access network is initiated; and switching the path for the video call performed between the first mobile station and the second mobile station from the path via the first radio access network to the path via the second radio access network, based on the information on the switching method, the information on the video bearer, and the information on the voice bearer, which are retained by the mobile transmission network.

2. The mobile communication method according to claim 1, comprising the steps of:

requesting the service control network to delete the video bearer, by the first mobile station;

requesting the mobile transmission network to delete the video bearer, by the service control network; and deleting the retained information on the video bearer in response to the request from the service control network, and requesting a radio base station in the first radio access network to delete the video bearer, by the mobile transmission network.

3. The mobile communication method according to claim 1, comprising the steps of:

requesting the service control network to add the video bearer, by the first mobile station;

requesting the mobile transmission network to add the video bearer, by the service control network; and adding the information on the video bearer to the retained information in response to the request from the service control network, and requesting a radio base station to add the video bearer, by the mobile transmission network.

4. The mobile communication method according to claim 2, wherein the information on the switching method indicates that both of the video bearer and the voice bearer are switched without being disconnected.

5. The mobile communication method according to claim 2, wherein the information on the switching method indicates that both of the video bearer and the voice bearer are switched without being disconnected.

6. The mobile communication method according to claim 3, wherein the information on the switching method indicates that both of the video bearer and the voice bearer are switched without being disconnected.

7. A mobile communication method in a mobile communication system which includes a first radio access network not supporting circuit-switched communications, a mobile transmission network which connects the first radio access network, a second radio access network supporting the circuit-switched communications, and a service control network, and which is capable of switching from a path via the first radio access network to a path via the second radio access network without disconnection of a path for video call performed between a first mobile station and a second mobile station, the mobile communication method comprising the steps of:

retaining information on a switching method for the path for the video call notified from the service control network, information on the video bearer, and information on a voice bearer, by a mobility management node included in the mobile transmission network before switching from a path via the first radio access network to a path via the second radio access network is initiated; and switching the path for the video call performed between the first mobile station and the second mobile station from the path via the first radio access network to the path via the second radio access network, based on the information on the switching method, the information on a video bearer, and the information on the voice bearer, which are retained by the mobile transmission network.

8. The mobile communication method according to claim 1, comprising the steps of:

transmitting a presence or absence of an object of switching from the path via the first radio access network to the path via the second radio access network, to a serving gateway device included in the mobile transmission network, by a policy and charging rules device included in the mobile transmission network; and transmitting the presence or absence of the object of switching which is received from the policy and charging rules device, to the mobility management node, by the serving gateway device.

9. The mobile communication method according to claim 7, comprising the steps of:

transmitting a presence or absence of an object of switching from the path via the first radio access network to the path via the second radio access network, to a serving gateway device included in the mobile transmission network, by a policy and charging rules device included in the mobile transmission network; and transmitting the presence or absence of the object of switching which is received from the policy and charging rules device, to the mobility management node, by the serving gateway device.

10. A mobility management node used in a mobile communication system which includes a first radio access network not supporting circuit-switched communications, a mobile transmission network which connects the first radio access network, a second radio access network supporting the circuit-switched communications, and a service control network, and which is capable of switching from a path via the first radio access network to a path via the second radio access network without disconnection of a path for video call performed between a first mobile station and a second mobile station, wherein the mobility management node:

retains information on a switching method for the path for the video call notified from the service control network, information on a video bearer, and information on a voice bearer before switching from a path via the first radio access network to a path via the second radio access network is initiated, and transmits a request of switching the path for the video call performed between the first mobile station and the second mobile station from the path via the first radio access network to the path via the second radio access network, based on the information on the switching method, the information on the video bearer, and the information on the voice bearer, which are retained, to a radio base station in the first radio access network.

* * * * *